United States Patent [19]

Davis

[11] 4,289,617
[45] Sep. 15, 1981

[54] WATER SOFTENING AND REVERSE OSMOSIS SYSTEM

[75] Inventor: Stephen H. Davis, Dayton, Ohio

[73] Assignee: Water Refining Company, Inc., Middletown, Ohio

[21] Appl. No.: 146,956

[22] Filed: May 5, 1980

[51] Int. Cl.³ .......................................... B01D 57/00
[52] U.S. Cl. .................... 210/109; 210/128; 210/256; 210/288; 210/321.1
[58] Field of Search .................. 210/638, 652–655, 210/663, 128, 256, 257.1, 257.2, 259–261, 263, 266, 287, 289, 291, 294, 321 R, 109, 119, 288, 321.1

[56] References Cited

U.S. PATENT DOCUMENTS

| | | | |
|---|---|---|---|
| Re. 27,280 | 2/1972 | Manjikian | 264/41 |
| 3,369,667 | 2/1968 | Clark et al. | 210/137 |
| 3,392,840 | 7/1968 | Clark et al. | 210/321 |
| 3,430,770 | 3/1969 | Clark et al. | 210/321 |
| 3,442,995 | 5/1969 | Bennett et al. | 264/66 |
| 3,483,282 | 12/1969 | Manjikian | 264/41 |
| 3,485,374 | 12/1969 | Manjikian et al. | 210/321 |
| 3,544,358 | 12/1970 | Manjikian | 117/63 |
| 3,578,175 | 5/1971 | Manjikian | 210/489 |
| 3,616,929 | 11/1971 | Manjikian | 210/321 |
| 3,674,152 | 7/1972 | Manjikian | 210/321 |
| 3,734,297 | 5/1973 | Windle | 210/321 |
| 3,821,108 | 6/1974 | Manjikian | 210/23 |
| 3,830,372 | 8/1974 | Manjikian | 210/321 |
| 3,849,305 | 11/1974 | Manjikian | 210/116 |
| 4,160,727 | 7/1979 | Harris | 210/259 |
| 4,165,273 | 8/1979 | Azarov et al. | 210/266 |
| 4,218,317 | 8/1980 | Kirschmann | 210/259 |

*Primary Examiner*—Ivars C. Cintins
*Attorney, Agent, or Firm*—Biebel, French & Nauman

[57] ABSTRACT

A system for the combined softening of water and reduction of dissolved solids from the water, which can be retrofitted to a conventional water softening apparatus, is disclosed. The system includes a pressure tank having a closure with an access opening, an inlet line for conveying hard water to the pressure tank, an outlet line for conveying softened water from the tank and having a mouth located proximate the bottom of the tank, pelletized treatment material located within the pressure tank for softening the raw water, a plurality of tubular membrane carriers embedded within the treatment material, a plurality of semi-permeable reverse osmosis membranes enclosing the tubular membrane carriers, and a conduit for collecting the purified water from the membrane carriers. The conduit includes a plug sealing the access opening and having an upper recess and a plurality of passages communicating with the recess, a plurality of flexible tubes, each extending between a membrane carrier and a passage so that purified water may pass from the membrane carrier to the plug. A pure water line is attached at an end to the recess of the plug and communicates with a holding tank to which water is supplied.

18 Claims, 4 Drawing Figures

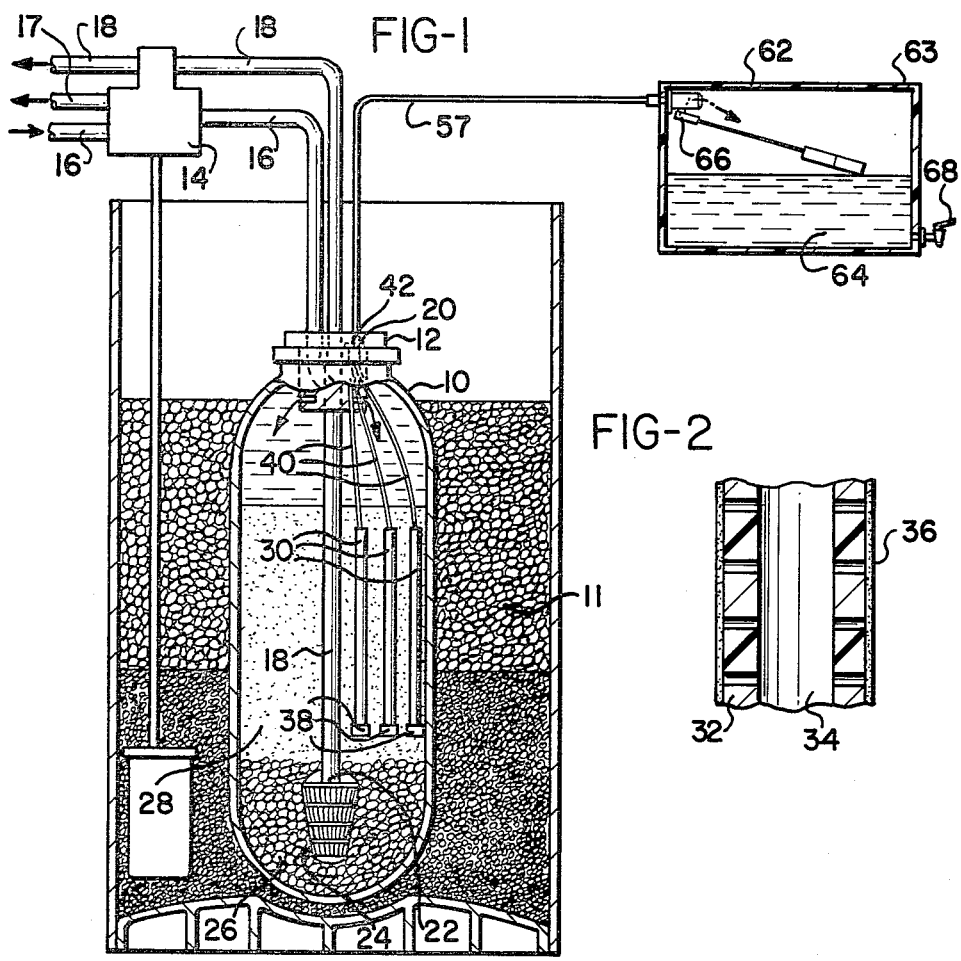
FIG-1
FIG-2
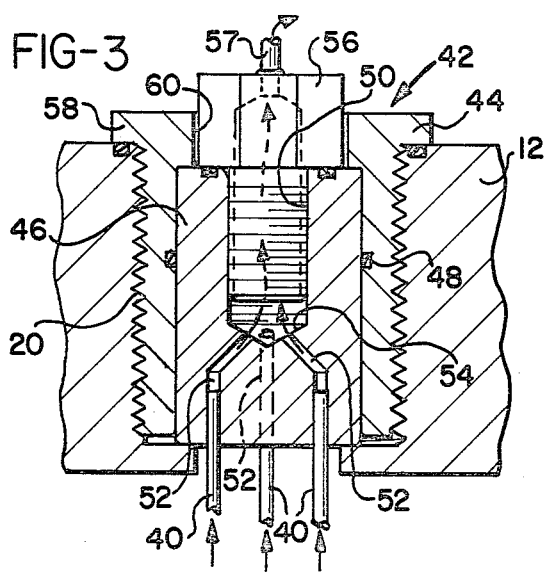
FIG-3
FIG-4

4,289,617

WATER SOFTENING AND REVERSE OSMOSIS SYSTEM

BACKGROUND OF THE INVENTION

1. Field of the Invention

The present invention relates to water treating devices and, more particularly, to a system in which hard water is softened and a reduction in the dissolved solids in the water is obtained.

2. Prior Art

Water softener systems presently in use are of the type in which hard water enters the top of a pressure tank through an inlet line and percolates through a bed of treatment material, such as zeolite, and passes out of the pressure tank through an outlet line having a mouth located proximate the bottom of the pressure tank. As the hard water percolates through the zeolite bed, an ion exchange takes place in which sodium ions held by the zeolite are exchanged for the hard metal ions in the water.

The water softening ability of the zeolite bed is gradually reduced and, after a predetermined quantity of water has been softened, the zeolite bed becomes depleted. The zeolite bed is thereafter regenerated by passing a brine solution through it so that the ion exchange process is reversed.

Prior to the regeneration cycle of a typical water softening system, the system goes through a backwash cycle in which hard water enters the pressure tank through the outlet line and percolates upward to leave the tank through the inlet line. Thus, the zeolite is agitated and any large deposits of debris carried into the pressure tank from the inlet line are flushed out of the pressure tank.

Reverse Osmosis water treatment systems in which water is passed through a semi-permeable membrane carried on a rigid structure such as a perforated metal tube and collected in a holding tank to filter out unwanted contaminants are known in the art. Such a system is disclosed, for example, in U.S. Pat. No. 3,616,929, issued Nov. 2, 1971, to Manjikian; such a system may be connected in tandem with a water softening system so that the reverse osmosis treatment system is either upstream or downstream of the water softening system. In either case the treatment system operates independently of the water softening system.

A disadvantage of such a reverse osmosis treatment system is that small particulate contaminants collect on the surface of the membranes to block the flow of water, thus necessitating periodic cleaning of the membranes. Other such systems have included a drain from the tank holding the membrane elements to provide a continuous flow of water past the elements, thus cleansing the membrane surfaces. This results in a substantial amount of water being wasted, however. Furthermore, prior art reverse osmosis treatment systems require a pressure tank which is separate from any softener system utilized therewith thus adding to the complexity and cost of the overall system. Accordingly, there is a need for a water softening and dissolved solid reduction system in which hard water is softened and dissolved solids removed therefrom within a single vessel, which system is easy to maintain.

SUMMARY OF THE INVENTION

The present invention provides a water softening and dissolved solid reduction system in which semi-permeable membrane filters are embedded in the treatment material of a conventional water softener. Hard water entering the pressure tank is softened through an ion exchange process with a zeolite bed and filtered through a semi-permeable membrane element to be conveyed to a holding tank which can be remotely located from the pressure tank.

Such a system has several distinct advantages over the use of a separate distinct water softening system connected in tandem with a dissolved solid reduction system. For example, the treatment material within the pressure tank acts as a gross filter to trap large particles of contaminants which would otherwise collect upon and clog the membrane surfaces and prevent filtration of the water.

During the backwash cycle of the system of the present invention, the percolation of water up through the treatment material causes the zeolite pellets to become agitated and abrade the exterior surface of the membrane elements. In this fashion, smaller contaminants which have collected upon the exterior surface of the membrane element are rubbed off and flushed out of the resin tank during the backwash cycle.

Another advantage of the system of the present invention is that the system can be retrofitted to an existing water softening pressure tank, thereby reducing the overall size of the system and the costs involved in obtaining filtered and softened water. The membrane elements can be sized to fit through the access opening in the top of the pressure tank so that they may be pushed through the opening to be embedded in the treatment material.

The present invention comprises a pressure tank having a closure with an access opening therethrough, an inlet line for conveying hard water to the pressure tank, an outlet line for conveying softened water from the pressure tank, pelletized treatment material located within the pressure tank for softening the hard water, a plurality of membrane elements embedded in the treatment material, each including a tubular porous membrane carrier covered with a semi-permeable membrane, and a conduit for collecting purified water from the membrane element and conveying it to a holding tank. It is preferable to construct the membrane carriers from long tubes of a small diameter so that the carriers with their semi-permeable membrane coverings can be inserted through the access opening in the closure of the pressure tank.

In a preferred embodiment, the conduit for conveying the purified water from the membrane carriers to the holding tank comprises a plug fitted into the access opening, a plurality of tubes connecting each membrane element with the plug, and a pure water line extending from the plug to the holding tank. The holding tank can be fitted with a float valve so that the flow of pure water from the membrane elements can be interrupted when the holding tank is full.

Accordingly, it is an object of the present invention to provide a system in which hard water is both softened and the dissolved solid content of the water reduced within a single pressure tank; to provide such a system in which the semi-permeable membranes are periodically cleaned automatically by the operation of the water softening system; and to provide such a system which can be retrofitted to an existing water softening system.

Other objects and advantages of the invention will be apparent from the following description, the accompanying drawings and the appended claims.

BRIEF DESCRIPTION OF THE DRAWINGS

FIG. 1 is a side elevation in section of the present invention;

FIG. 2 is a partial side elevation, in section, of a membrane element;

FIG. 3 is a side elevation in section of the plug of the present invention taken at line 3—3 of FIG. 4; and FIG. 4 is a plan view of the plug of FIG. 3.

DETAILED DESCRIPTION OF THE PREFERRED EMBODIMENT

As shown in FIG. 1, the water softening and reverse osmosis system of the present invention employs a standard pressure tank 10 mounted in a brine tank 11. The pressure tank 10 is fitted with a closure 12. A valve mechanism 14 controls the flow of water through an inlet line 16, a drain line 17, and an outlet line 18. Inlet line 16 and outlet line 18 pass through openings in closure 12, which also defines an access opening 20.

The outlet line 18 extends from the valve mechanism 14 to a mouth portion 22 affixed with an outlet head 24 proximate the bottom of the pressure tank 10. The outlet head 24 is buried within a bed of gravel 26. The gravel bed 26 supports a bed of treatment material 28, preferably a granulated resin such as zeolite.

Embedded within the treatment material 28 are a plurality of membrane elements 30. As shown in FIG. 2, each membrane element includes a membrane carrier 32 which is generally tubular in shape and formed of a porous or perforated material. Each membrane carrier 32 has a hollow core 34 and is closed at both ends.

Each membrane carrier 32 supports a semi-permeable membrane 36 which completely encloses the membrane carrier. A weight 38 is attached to the bottom portion of each membrane element 30 and the upper portion of the hollow core 34 of each membrane element communicates with an associated one of the flexible tubes 40. Tubes 40 extend upward from the upper portion of the hollow cores 34 and are connected to a plug 42 which is threaded into the access opening 20 of the closure 12.

As best shown in FIG. 3, the plug 42 consists of an outer member 44, having generally an inverted cup shape, and an inner member 46. The inner member 46 is generally cylindrical in shape and is sized to fit within the outer member 44. An O-ring 48 is carried by the outer member 44 to provide a pressure seal between the inner member 46 and the outer member 44. The outer member 44 and inner member 46 form a recess 50 which communicates with passages 52 formed within the inner member 46. Each passage 52 receives a flexible tube 40 extending from a membrane element 30. Thus, a pathway is provided from the hollow core 34 of each of the membrane elements 32 to the recess 50 of the plug 42.

The floor 54 of the recess 50 is sloped to allow a number of passages 52 to terminate in the recess 50. As shown in FIG. 3, it is preferable to space the passages 50 evenly about the circumference of the inner member 46. The recess 50 is threaded so that it can receive the male end 56 of water line 57. As shown in FIGS. 3 and 4, the outer member 44 includes a raised haxagonal portion 58 having an opening 60 therein to allow the pure water line 56 to pass through to the recess 50.

Referring again to FIG. 1, the pure water line 57 runs to a holding tank 62 having a vent 63. The holding tank 62 preferably is sized to receive several gallons of water 64. The holding tank 62 includes a float valve 66 which interrupts the flow of water from the water line 57 when the water level within the holding tank reaches a predetermined level. The holding tank may include a tap 68 or other means of dispensing the water 64 held within.

The operation of the water softening and reverse osmosis system of the present invention is as follows. Hard water under pressure enters the pressure tank 10 at its upper portion through the inlet line 16 and percolates through the treatment material 28 and the gravel bed 26 to the outlet head 24 of the outlet line 18. As the hard water passes through the treatment material 28 an ion exchange occurs and the hard water is softened. Simultaneously, a portion of the softened water adjacent the membrane elements 30 is forced through the semi-permeable membrane 36 and the membrane carrier 32 and a substantial portion of the dissolved solids are thereby removed. The water then collects within the hollow cores 34 of the membrane elements 30 and is forced up through the flexible tubes 40 by the pressure differential across the membranes 36. The water flows through the pure water line 57 to collect in the holding tank 62. No pumping mechanisms are required; the vent 63 maintains the pressure within the holding tank 62 below that of the softened water within the pressure tank 10. Thus, the water 64 is driven into the holding tank 10 by the pressure differential.

After a period of use, large contaminants in the hard water entering the pressure tank 10 through the inlet line 16 are collected by the treatment material 28 and smaller contaminants collect on the exterior surface of the semi-permeable membrane 36 of the membrane elements 30. During the backwash cycle of the water softener, the valve mechanism 14 directs the flow of hard water through the outlet line 18 to enter the pressure tank 10 through the outlet head 24. The hard water thus percolates upward through the gravel bed 26 and the treatment material 28 to exit the top of the pressure tank 10 through the inlet line 16 and out the drain line 17. The resultant agitation of the treatment material 28 causes the individual pellets of zeolite to abrade against the exterior surface of the semi-permeable membrane 36 thus scrubbing away the contaminants that have collected there. These contaminants, along with the larger contaminants entrapped by the zeolite pellets, are flushed out of the pressure tank 10 through the inlet line 16 during the backwashing cycle. Thus, the semi-permeable membranes 36 of the membrane elements 30 are cleaned every time the water softener goes through a backwash cycle and there is no need to remove the membrane elements from the pressure tank 10 for cleaning.

It is preferable to construct the membrane carriers 32 of the membrane elements 30 to have a long tubular shape so that they may be inserted into the pressure tank 10 through the access opening 20 thereby obviating the need for removal of the closure 12. The weights 38 attached to the bottom portion of the membrane elements 30 serve to orient the membrane elements in a substantially vertical position and decrease the likelihood that the membrane elements will rise above the upper level of treatment material 28 within the pressure tank 10. The flexible tubes 40 can be cemented to the membrane elements 30 and the passages 52 of the plug 42 by an epoxy cement. Similarly, the weights can be cemented to the lower portion of the membrane elements by means of epoxy cement.

The components of the water softening and purifying system of the present invention are readily available in industry. For example, a suitable semi-permeable membrane 36 can be fabricated from a cellulose acetate or a cellulose acetate butyrate. The membrane carrier 32 preferably is made from a plastic or metal tube having a multiplicity of holes formed in its sides. The plug 42 and the male end 56 of the pure water line 57 should be formed of a stainless steel or other corrosion resistant metal.

Although only a small number of membrane elements 30 are shown embedded in the treatment material 28 of the pressure tank 10 of FIG. 1, it is preferable to employ between 5 and 40 tubes, each approximately one-half inch in diameter by 13 inches long. With such an arrangement of tubes, the present invention can supply approximately two to ten gallons of water per day to tank 62, provided that the water pressure is maintained at approximately 50 p.s.i. within tank 10.

While the system herein described constitutes a preferred embodiment of the present invention, it is to be understood that the invention is not limited to this precise form of apparatus and that changes may be made without departing from the scope of the invention.

What is claimed is:

1. A water softening and reverse osmosis treatment system comprising:
   a pressure tank;
   an inlet line for conveying hard water to the pressure tank;
   an outlet line for conveying softened water from the tank;
   treatment material located within the pressure tank for softening the hard water;
   a plurality of semi-permeable reverse osmosis membrane element means embedded within the treatment material; and
   means for collecting water from the membrane element means.

2. The system of claim 1 wherein the outlet line has a mouth located below the membrane element means within the pressure tank.

3. The system of claim 1 wherein the means for collecting water includes a holding tank and a conduit means communicating therewith.

4. The system of claim 3 wherein the holding tank includes a float valve to control the flow of water from the membrane element means to the holding tank.

5. The system of claim 3 wherein the pressure tank includes a closure having an access opening therethrough.

6. The system of claim 5 wherein the conduit means comprises:
   a plug sealing the access opening and having an upper recess and a plurality of passages communicating with the recess;
   a plurality of flexible tubes, each extending between a respective one of the membrane element means and one of the passages so that water may pass from the membrane element means to the plug; and
   a water line attached to an end to the recess of the plug and at another end to the holding tank.

7. The system of claim 5 wherein each membrane element means each includes a tubular perforated membrane carrier and a semi-permeable reverse osmosis membrane covering the membrane carrier.

8. The system of claim 7 wherein each of the membrane element means has a cross-sectional diameter of a size less than the diameter of the access opening.

9. The system of claim 7 wherein each of the membrane element means further includes a weight means attached at a lower end thereof.

10. The system of claim 1 wherein the treatment material is a pelletized resin.

11. A water softening and reverse osmosis treatment system comprising:
    a pressure tank;
    a closure for the pressure tank having an access opening therethrough;
    an inlet line for conveying raw water to the pressure tank;
    an outlet line for conveying softened water from the tank;
    a treatment material held within the pressure tank;
    a plurality of tubular membrane elements embedded within the treatment material, each membrane element including a perforated membrane carrier having a hollow core and a semi-permeable reverse osmosis membrane covering the external surface of the membrane carrier, each membrane element having a diameter less than the diameter of the access opening;
    a plug sealing the access opening and having an upper recess and a plurality of passages communicating with the recess;
    a plurality of flexible tubes, each communicating with a hollow core and extending to a passage so that water may pass from the membrane carrier to the plug;
    a holding tank; and
    a water line attached to an end to the recess of the plug and at an opposite end to the holding tank.

12. In a water softening system of the type having a pressure tank, a closure for the pressure tank having an access opening, an inlet line, an outlet line having a mouth located proximate the bottom of the tank, and a treatment material located within the pressure tank, a reverse osmosis system comprising:
    a plurality of tubular membrane elements embedded within the treatment material, each element including a membrane carrier having a hollow core and a semi-permeable reverse osmosis membrane covering the exterior of the membrane carrier; and
    means for collecting water from the membrane carriers.

13. The water softening system of claim 12 wherein the means for collecting water includes a conduit means communicating with a holding tank.

14. The water softening system of claim 13 wherein the holding tank includes a float valve to control the flow of water from the membrane carriers to the holding tank.

15. The water softening system of claim 13 wherein the conduit means comprises:
    a plug sealing the access opening and having an upper recess and a plurality of passages communicating with the recess;
    a plurality of flexible tubes, each extending between one of the membrane elements and a respective one of the passages so that water may pass from the membrane carriers to the plug; and
    a water line attached to an end to the recess of the plug and at another end to the holding tank.

16. The water softening system of claim 15 wherein each of the membrane elements has a diameter of a size less than the diameter of the access opening.

17. The water softening system of claim 16 wherein each of the membrane elements includes a weight means attached to a lower end.

18. In a water softening system of the type having a pressure tank, a closure for the pressure tank having an access opening, an inlet line, an outlet having a mouth located proximate the bottom of the tank, and a treatment material located within the treatment tank, a reverse osmosis treatment system comprising:

a plurality of tubular membrane elements embedded within the treatment material, each membrane element including a perforated membrane carrier having a hollow core and a semi-permeable reverse osmosis membrane covering the exterior surface of the membrane carrier, each membrane element having a diameter less than the diamter of the access opening;

a plug sealing the access opening and having an upper recess and a plurality of passages communicating with the recess;

a plurality of flexible tubes, each extending between one of the membrane carriers and one of the passages so that water may pass from the membrane carriers to the plug;

a holding tank for receiving water; and a water line attached at an end to the recess of the plug and at an opposite end to the holding tank.

* * * * *

UNITED STATES PATENT AND TRADEMARK OFFICE
CERTIFICATE OF CORRECTION

PATENT NO. : 4,289,617

DATED : September 15, 1981

INVENTOR(S) : Stephen H. Davis

It is certified that error appears in the above—identified patent and that said Letters Patent is hereby corrected as shown below:

Column 5, line 63 "attached to an end" should be --attached at an end--.

Column 6, line 36, "attached to an end" should be --attached at an end--.

Column 6, line 67, "attached to an end" should be --attached at an end--.

Column 7, line 6, "lower end" should be --lower end thereof--.

Signed and Sealed this

First Day of December 1981

[SEAL]

Attest:

Attesting Officer

GERALD J. MOSSINGHOFF

Commissioner of Patents and Trademarks